March 17, 1959 D. GABOR 2,878,417

CATHODE RAY TUBES

Filed March 22, 1957 4 Sheets-Sheet 1

March 17, 1959 D. GABOR 2,878,417

CATHODE RAY TUBES

Filed March 22, 1957 4 Sheets-Sheet 4

United States Patent Office 2,878,417 Patented Mar. 17, 1959

2,878,417

CATHODE RAY TUBES

Dennis Gabor, London, England, assignor to National Research Development Corporation, London, England, a corporation of Great Britain Application March 22, 1957, Serial No. 648,459

Claims priority, application Great Britain March 23, 1956

19 Claims. (Cl. 315—21)

Figure 1:
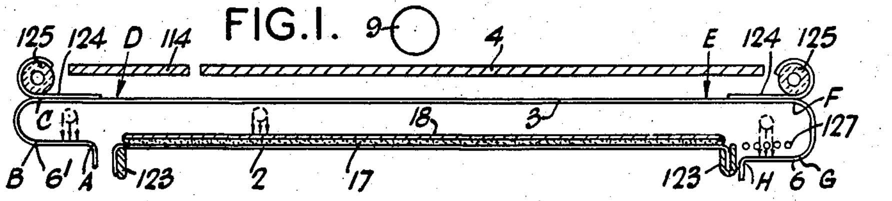

The present invention relates to cathode ray tubes and is concerned with a tube which is of generally flat configuration, that is to say, is free from the conventional tapering portion and neck extending perpendicularly away from the screen of the tube.

In patent application Serial No. 549,712, now Patent No. 2,795,729, dated June 11, 1957, there are described constructions of cathode ray tubes in which the electron beam is directed in a plane substantially parallel to and spaced from the screen of the tube and is subject to deflections in that plane, an end portion of the beam being deflected towards and into contact with the screen at a controlled distance across the screen by means of an electrostatic field. This field is set up between an array of electrodes arranged in a plane parallel to the screen and the screen itself. Alternatively a further array of electrodes may be provided adjacent the screen and the deflection field is then set up between the two electrode arrays. In order to produce the desired deflection of the electron beam towards the screen at varying distances across the screen so that, for example, a television-type raster may be set up on the screen, there is described in that specification an organ termed the scanning valve which is included in the cathode ray tube and serves to control the charging and discharging of the elements of the electrode array so as to produce the required deflection field moving across the face of the screen in the desired manner.

The present invention relates to certain modified forms of cathode ray tube of the same kind as that described in the specification above referred to but in which the charging and discharging of the deflection electrode array is effected by other means and in preferred modifications by the cathode ray tube picture beam itself.

According to the present invention a cathode ray tube is provided comprising a screen, an array of conductive elements in a plane facing said screen, means for directing an electron beam into the space between said screen and said array, and means for controlling the potentials on the elements of said array so as to deflect an end portion of said electron beam towards said screen at varying distances across it, wherein the means for controlling the potentials on said conductive elements comprise means for effecting electron bombardment of at least one zone of said array to discharge it and means associated with at least one other zone of the array for causing charging of said array under the action of electron bombardment.

According to a particular aspect of the invention a cathode ray tube is provided comprising a screen, an array of conductive elements in a plane facing said screen, means for directing an electron beam into the space between said screen and said array, and means for controlling the potentials on the elements of said array so as to deflect an end portion of said electron beam towards said screen at varying distances across it, wherein the means for controlling the potentials on said conductive elements comprise at least two zones of said array, means for directing an electron beam (which may be the said electron beam) at different times towards each of said zones so as to bombard selected portions thereof and means associated with at least one of said zones for collecting secondary electrons emitted by the array under the action of such bombardment. The different parts of said array to be bombarded for charging and discharging purposes may be two zones, each extending crosswise of the elements of said array and arranged, for example, one on each side of the screen area, whereby the picture beam may be directed towards the one zone or the other by deflection of that beam parallel to the screen, or one or more separate beams may be set up associated with either or both of the said zones.

Deflection of an end portion of the beam or beams employed for charging and/or discharging the array towards the array in a direction normal to the screen may be effected by arranging for the zones of the array subject to bombardment to lie opposite other regions of the array across a gap and for the elements of the array to have a configuration such that a pattern of potential distribution extending across a region of the array is translated into an electrostatic field distribution appropriate to the desired deflection.

Assuming that the tube is to be designed to provide a television-type raster on the screen, the "X" or line deflection may be set up by means operating to deflect the beam in the plane parallel to the screen. The "Y" or frame deflection may be set up by discharging the elements of the array successively during the frame period at a rate such that the deflection of the beam towards the screen takes place at successive levels corresponding to successive line scans of the raster. The array may be recharged during the frame fly-back period or recharging may be effected at least in part during the frame scan period. These discharging and charging processes are effected by the electron beam or beams above referred to, which may be controlled in the same way as the picture beam or indeed may be the picture beam itself so that the potential distribution on the elements of the array serving to determine the level at which the next line is to be produced on the screen determines also the level at which discharging of the array is to proceed. The same potential distribution may also be used to determine the location at which recharging of the array is to take place, or alternatively the same principle may be adopted to control successive recharging of the elements of the array during the fly-back period independently of the forward part of the frame scan. The charging and discharging processes may be caused to take place in discrete steps using the line flyback time or may be carried out in a continuous process.

In order that the invention may be more clearly understood some embodiments thereof will now be described with reference to the drawings accompanying the provisional specification in which:

Figure 1 is a horizontal cross-section and

Figure 2:
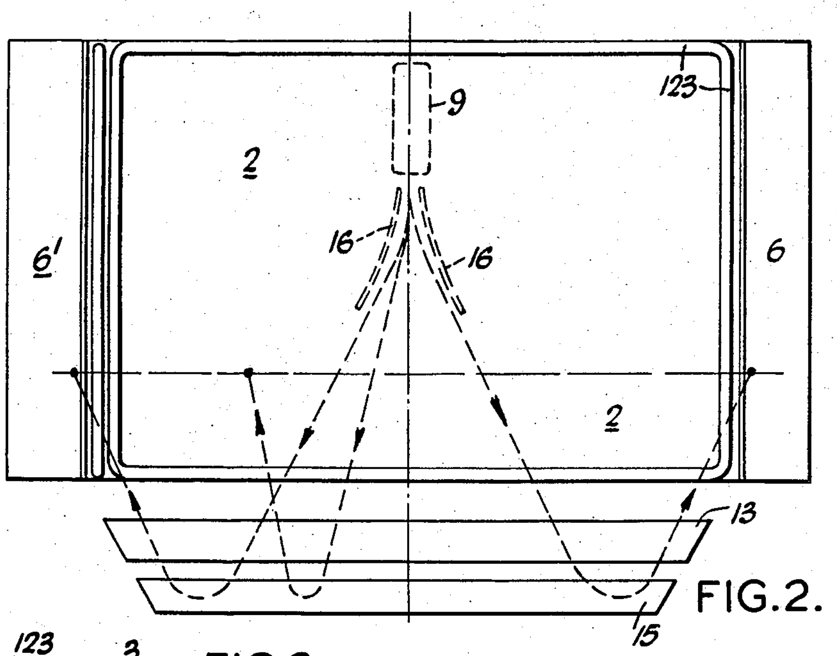

Figure 2 the elevational view and

Figure 3:
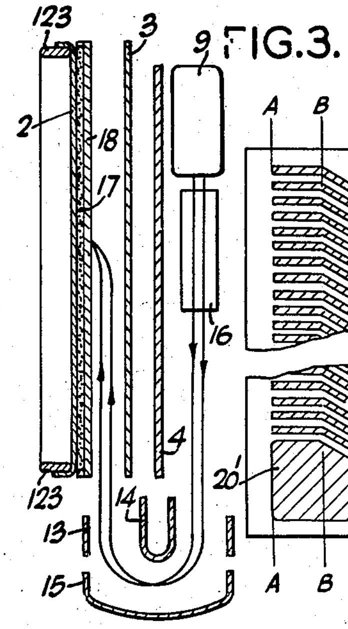
Figure 4:
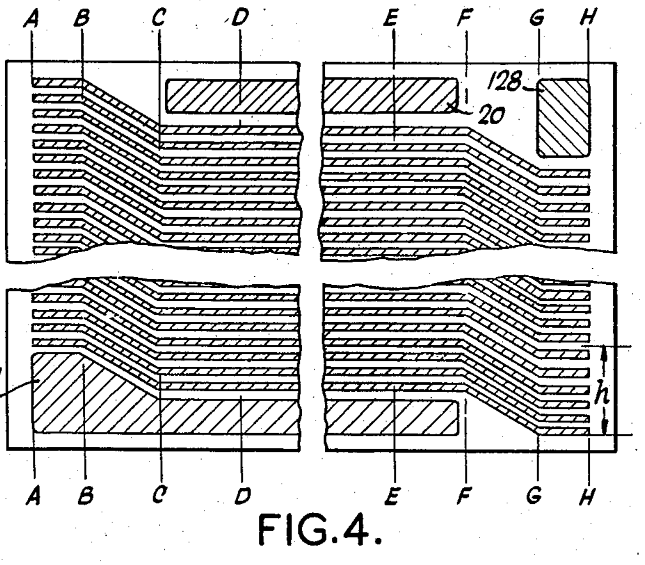
Figure 6:
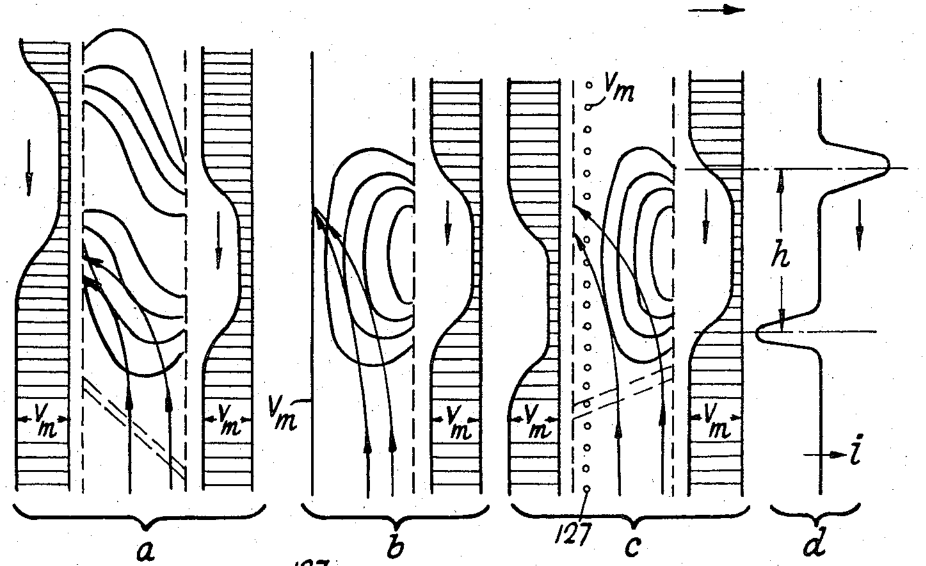
Figure 7:
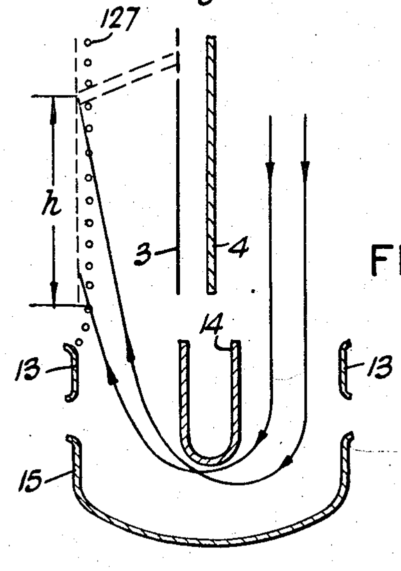
Figure 8:
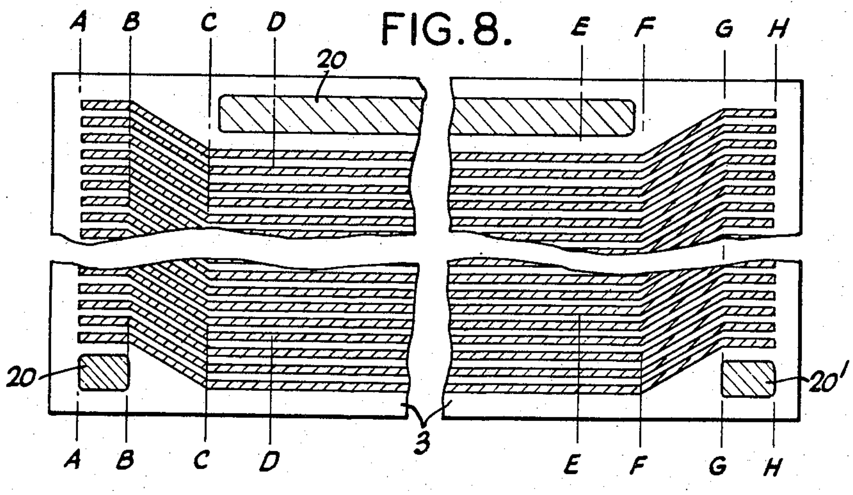
Figure 9:
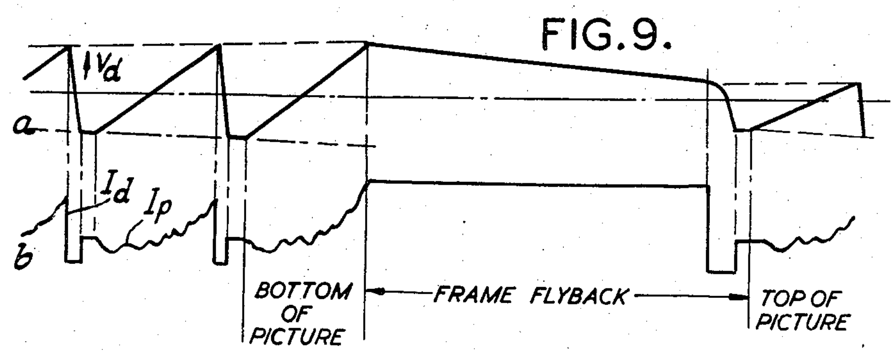
Figure 10:
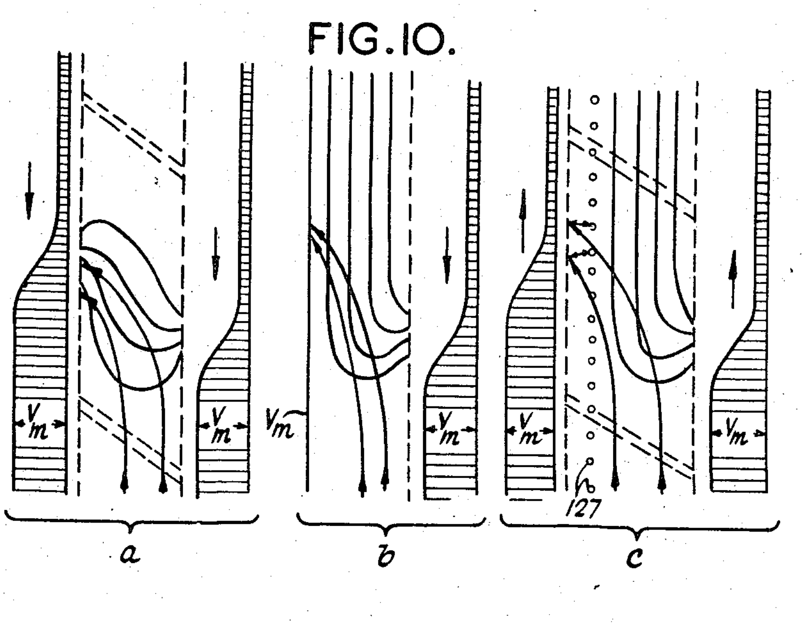
Figure 11:
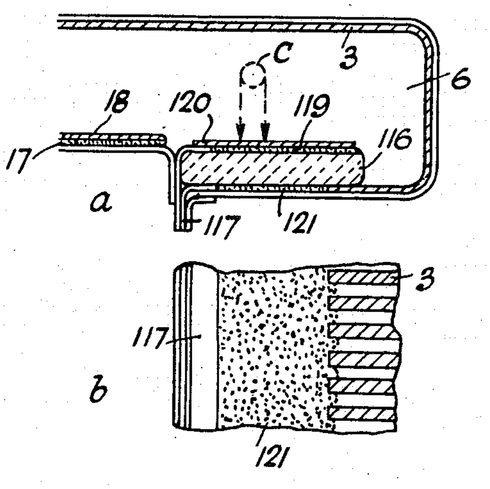
Figure 12:
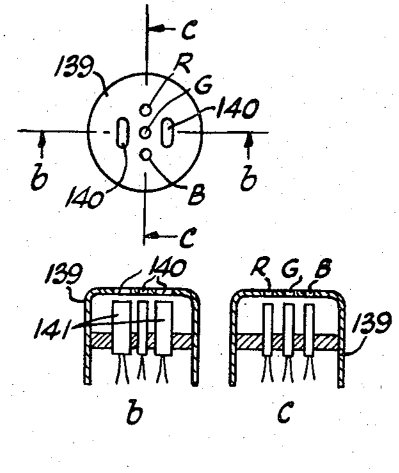

Figure 3 a vertical cross-section of the interior parts of the cathode ray tube according to the invention, Figure 4 is a developed view, partly broken away, of one element of the structure of Figures 1, 2 and 3, Figure 5 is a diagram of waveforms employed in operating the tube of Figures 1 to 4, Figure 6 is a series of explanatory diagrams explaining the operation of the tube according to Figures 1 to 4, Figure 7 is an enlarged vertical cross-sectional view of a part of the tube shown in Figures 1 to 4, Figure 8 is a developed view, partly broken away, of an element of a further modified form of tube according to the invention, Figure 9 is a diagram of waveforms employed in operating the tube modified according to Figure 8, Figure 10 is a series of explanatory diagrams relating to the operation of the tube modified as described with reference to Figure 8, Figure 11 comprises a cross-sectional view and a fragmentary elevational view of a portion of yet another modified form of tube according to the invention, and Figure 12 comprises three views two of them in section, of an electron gun suitable for use in tubes according to the invention to be employed for colour television.

Referring first to Figures 1 to 3, these show the construction of the internal parts of one form of tube according to the invention. To some extent these drawings are diagrammatic, supporting structures and connecting leads having been omitted for the sake of clarity. The structure comprises screen 2, which may be, for example, of woven glass cloth stretched upon a frame 123, bearing on its rear surface a layer 17 of suitable phosphor, backed by a layer 18 of aluminium in a conventional manner. Mounted behind and in a plane parallel to the screen 2 and spaced a short distance therefrom is an electrode array 3 which is supported by brackets 124 mounted on ceramic tubes 125 between which the array is stretched. The side edges of the array are bent round to form U-shaped portions 6 and 6', the front margins of which lie substantially in the same plane as, and adjacent to the vertical edges of the screen. The nature of the array 3 is shown in detail in Figure 4. It comprises a large number of linear conductors each insulated from one another mounted on a suitable insulating backing and having the configuration shown in Figure 4 the purpose of which will be explained later. Mounted on the same insulating support are electrodes 20, 20' and 128, the purposes of which will also be described later. The vertical lines A to H, shown on Figure 4, indicate regions of special significance in the array and will be used in the description of the tube operation. The location of these lines on the cross-sectional view of Figure 1 has been shown so that the three-dimensional configuration of the whole array can be readily deduced.

Mounted behind the array 3 and in close proximity thereto, so as to present appreciable capacity to the conductors 3, is a plate 4 which is preferably of high permeability magnetic material and which serves in part as a magnetic screen. This plate 4 covers substantially the whole area of the array facing the screen. A separate strip 114 extending from top to bottom of the array constitutes a further electrode, the purpose of which will be referred to below.

Behirnd plate 4 is an electron gun 9 shown diagrammatically since it may be of conventional design. It is arranged to direct its beam vertically downwards and below it are arranged deflector plates 16, also of conventional design which serve to produce, by electrostatic deflection, the X or line deflection required for the television raster. Below the parts of the structure so far described is an electron lens comprising parts 13, 14 and 15 shown in enlarged cross-section in Figure 7. This lens comprises a trough 15, which in operation is maintained at a negative potential, side plates 13 maintained at high potential and a central spine 14 also maintained at high potential. This lens, the design and functioning of which is described more fully in the patent referred to above, serves to reverse the electron beam from gun 9 back upon itself and upwards into the space between the screen 2 and the array 3. It will now be seen how an electron beam from gun 9 can be directed into the space immediately behind the screen 2 and deflected towards any region of the screen from one side to the other. It remains to be described how the end of the beam is brought into contact with the screen, and how this may be effected at varying levels of the screen so as to generate a television raster. This is effected by suitable control of the potential on conductors 3 in the manner described in Patent No. 2,795,729 previously mentioned. Briefly, this action may be described as follows:

Assume that the layer 18 on the screen is maintained at the maximum positive potential used in the tube and that initially the conductors 3 are charged to this same potential. The beam from gun 9, passing upwards through the space between the screen 2 and the array 3 will, in these circumstances, pass straight through without deflection. If now one or more of the conductors at the top of the array are discharged so as to become sufficiently negative to the potential of the screen, a transverse field will be set up between the array and the screen, and this will serve to deflect the beam as it enters this region towards and into impact with the screen, and at the same time, tending to focus it on the screen. The sharpness of the angle through which the beam is deflected, and the extent to which it is focused will, of course, depend upon the configuration of this transverse deflecting field which in turn will depend upon the potential distribution between the conductors in the region producing this deflection. In order to produce deflection of the beam towards the screen at successively lower levels, it is necessary to discharge the conductors 3 successively at such a rate that the required potential distribution between them will be set up to produce the deflection and focusing required in the beam, and that the region over which this distribution is set up will move downward at the speed required for the television frame scan.

In Patent No. 2,795,729 this discharge of the deflection array as well as the process of recharging to the maximum H. T. potential is carried out by means of a separate organ referred to as the scanning valve. In the tube now being described, these processes are effected by the picture beam itself or by a further beam from the same electron gun 9. The discharging and recharging effects are brought about in the regions 6 and 6' of the electrode array. The normal line scan of the television raster would, of course, be adjusted to deflect the beam over the width of the screen 2 during the line scan time. For the purposes of the tube now being described, it is arranged that immediately prior to the commencement of each line scan, the beam is deflected beyond the edge of the screen and into the region 6' while immediately following the end of each line scan it is deflected beyond the other edge of the screen into the region 6.

From consideration of Figures 1 and 4, it will be seen that the ends of the conductors 3 between the vertical lines A and B lie in the plane of the screen 2 opposite the portions at the rear between vertical lines C and D. It will be seen that by virtue of the sloping portions between B and C a stagger is introduced into the relative positions of these conductors so that the ends (between A and B) lie opposite portions between C and D of conductors which are higher in the array of conductors. Figure 4, which is to some extent, diagrammatic, but nevertheless typical, shows the fourth conductor down lying in the region A to B opposite the top conductor in the region C to D. Consequently, if the top conductor is discharged the transverse potential gradient between it and the still fully charged fourth conductor down will produce deflection of the beam towards the front so that it will tend to impinge at least in part upon the second conductor down, thereby discharging it. Clearly this sets up a progressive action which tends to move the forwardly deflecting field set up by the conductors 3 progressively downwards. The extent to which any given conductor is discharged will depend, of course, upon the time for which it is bombarded by the beam and the current in the beam so that it will appear that the speed at which the deflecting field can be made to move downwards across the array of conductors 3 will depend upon the time between successive line scans allocated to the illumination of the conductor ends by the beam and the intensity of the beam.

It will be appreciated that during this bombardment any secondary electron emission set up will tend to flow to the next conductor below the point of bombardment, which is of course still at maximum H. T. potential but this effect will not be very marked and there will in fact be a net current discharging the bombarded conductor. It does not follow, of course, that the beam will bombard only one conductor at a time and in practice, of course, the degree to which each conductor is discharged at each bombardment must be adjusted so that the wave of discharge which passes down the array is of the required shape to produce the desired deflection and focusing field. The following parameters must therefore be mutually adjusted to provide the desired wave shape as well as the desired speed of propagation of the wave down the array:

(1) Capacity of each conductor (mainly to plate 4).
(2) Beam current.
(3) Beam focusing.
(4) Time of bombardment.
(5) The geometry of the array.

It is preferable that the capacity of the array to backing plate 4 should be not too small, for two reasons. One reason is that any stray electrons which might reach the array conductors will affect the rate of discharge and therefore the speed of the frame scan. This is harmful insofar as the effect is apt to be proportional to picture brightness and therefore will have a variable effect on the frame scan which it would be difficult to correct. The other reason is that the capacity of the conductors to the backing plate should be large in relation to the capacity between the conductors as otherwise there would be a spreading of the wavefront of the discharge wave. The beam current can, of course, be adjusted and provides the variable which may be used to control the frame scan speed. The beam focusing is, of course, dependent upon the geometry of the array (spacing between the conductors, spacing between the array and the screen, stagger between the front and rear portions of the conductors in regions 6 and 6' etc.) and upon the wave shape itself, although some control is possible by variation of the convergence of the beam from the electron gun and of the position of the beam between the array and the screen. These latter factors are discussed in Patent No. 2,795,729 above referred to.

In order to start the discharge wave running down the array, the electrode 20 is provided at the top of the array. This electrode is maintained permanently at low potential, e. g. the potential of the electron gun cathode, so that with the array fully charged there will appear a transverse potential gradient between the top conductors between A and B, and electrode 20 between C and D. This serves to provide the deflection of the beam towards the end portions of the array conductors for the commencement of the frame. At the bottom of the array an electrode 20', maintained permanently at high potential, is provided and this serves to arrest the frame scan at the end of its run.

At the region 6 on the other side of the tube, the recharging of the array takes place. This is brought about by deflection of the beam towards the array conductors in the same way as before but it will be noticed that the stagger between the conductors at the region E to F and their end portions between G and H, is in the reverse sense to that used in region 6' in that the ends of the conductors appear opposite regions of conductors lower in the array. Additionally there is introduced a grid 127 maintained permanently at the maximum potential to which the array is required to be charged. The effect of this grid is that the beam, when it enters region 6, will again be bent forward towards the ends of the conductors 3 (between G and H) but it will impinge upon the ends of conductors at a higher level in the array than those producing the forwardly deflecting zone across the screen. Additionally, the grid 127 will serve to collect any secondary electrons emitted from the array and it is arranged by suitable choice of the voltage and the material of the conductors that this secondary emission will be at a secondary/primary ratio greater than 1. This is equivalent to a positive current flowing to the array and hence those conductors struck by the beam in this region will be recharged. This recharging effect is less critical than the discharge effect above described since the conductors bombarded by the beam, and from which secondary electron emission takes place, will tend to stabilise themselves at the voltage of the grid 127. It is only necessary therefore for the bombardment in this region to be carried out long enough to ensure that this equilibrium potential is substantially reached.

In this way the conductors are recharged at a location which moves progressively down the array a short distance behind the discharged zone.

An electrode 128 maintained permanently at high potential serves to receive the beam in the region 6 during the first part of the frame scan, until the discharge wave has moved down far enough for recharging of the top conductors to commence.

Figure 5:
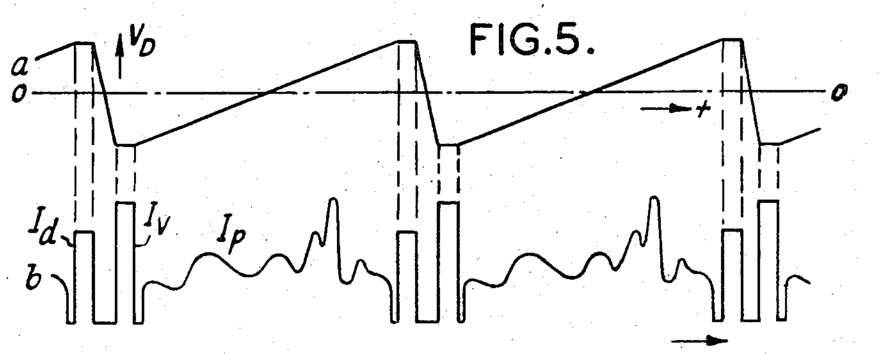

The operation of the tube in its various phases will be more clearly appreciated from a study of Figures 5 and 6. Figure 5 shows at (*a*) the voltage waveform to be employed for the X or line sweep applied to deflection plates 16. It will be seen that at each end of the sweep saw-tooth there are horizontal portions one immediately preceding and the other immediately following the flyback and occupying part of the flyback time. These portions provide the "dwell" of the beam in the charging and discharging regions 6 and 6' respectively. Figure 5(*b*) shows the modulation waveform applied to the electron gun grid. It includes the usual picture modulation signals $I_p$ and, instead of a complete black-out during the flyback time two bright-up signals $I_v$ and $I_d$ coinciding with the pauses in the line sweep.

Figure 6(*a*) illustrates the conditions in the discharging region 6'. The left-hand vertical dotted line represents the array in the region A—B, the right-hand vertical dotted line the array in the region C—D and the oblique broken lines indicate the cross-connections B—C between these two regions. The arrowed lines show the path of the electron beam and the curves are equipotential lines showing the two regions of electrostatic field in the discharge zone (lower) and the recharge zone (upper). The potential distributions on the two sides of the array are shown to the left and right, with voltage plotted horizontally from right to left. It will be noticed how the electron beam is deflected in the lower zone so as to be focused on to the lowermost conductors in this zone so as to discharge them. As the discharge proceeds the beam will be bent over at progressively lower levels so that at each illumination, progressively lower conductors will be discharged. By this action the lower deflection zone will move progressively down the array.

Figure 6(*b*) shows in similar manner the state of affairs in the region occupied by the picture screen, the left-hand vertical line representing the screen aluminium layer which is, of course, maintained at maximum positive potential $V_m$. It will be seen that the field in this case bends the beam less sharply but with better focusing on the screen, the beam itself moreover being shown somewhat thinner. During this phase, while the line is being painted on the screen the charge distribution on the array is of course unaffected and the diagram applies therefore to any part of the screen across its width during a line scan.

Figure 6(*c*) shows the state of affairs in the recharging region 6. It will be noticed from the oblique broken lines how the cross connections between the array conductors on the right (region E—F) and those on the left (region G—H) slope the opposite way to those in Figure 6(*a*). Grid 127 also appears in this figure and has the effect that the field is of the same form in this region as it is in the region of the screen (Figure 6(*b*)). Hence the beam deflection is much the same in this region as in the picture region but a bigger beam, illuminating a larger area is shown. Owing to the action of grid 127 above described, the conductors bombarded during this phase are recharged to maximum HT. The potential distributions are again shown to left and right of the drawing. It will be appreciated how the recharging zone will move down the array in concert with the discharging zone, a fixed distance behind it.

The right-hand diagram, Figure 6(*d*) shows the currents flowing to the array in the discharging and recharging zones. The different current levels required in the electron beam during the three phases, as represented by the different beam cross-sections, may be produced by different modulation voltages applied to the electron gun grid and in Figure 5(*b*) the pulses $I_v$ have been shown greater in amplitude than pulses $I_d$ for this reason. Alternatively, of course, different cathodes, suitably modulated, may be employed for the respective beams.

It has been noted that the process of recharging as described above lags behind the discharging process by a fixed distance so that when the frame scan reaches the bottom of the array there will be a zone which has been discharged and requires to be recharged before the new frame can start at the top. This may be taken care of in various ways but one method is illustrated in Figure 7 which shows in cross-section the lower end of the array in the recharging zone together with the grid 127 and the reversing lens above referred to comprising electrodes 13, 14 and 15. By applying to the repeller electrode 15 a small positive potential instead of the potential of the electron gun cathode the beam is distorted in the manner shown in the drawing so that it bombards the whole of the residual region to be recharged. Since the whole of the frame flyback time is available for this purpose it is not necessary to increase the beam current during this phase to compensate for the reduction in current per conductor of the array due to this spreading out of the beam. The voltage applied to electrode 15 may be in the form of a positive-going square wave applied for a suitable proportion of the frame flyback time.

Control of the speed of the charging and discharging processes may be achieved by reference to a signal from electrode 114 mentioned above. This electrode is capacitively coupled to the whole deflection array of conductors 3 so that any flow of current to any one of the conductors will produce a corresponding current to electrode 114. As the discharge of the array progresses, therefore, the current in the electron beam flowing to the conductors of the array will be reproduced as a current to the electrode 114 the integrated value of which will represent the state of discharge of the array. This current can therefore be used to provide a control signal by which the speed of the discharge process may be controlled, e. g. by variation of the beam intensity or the time for which the beam is released for discharging purposes. In the same way, the speed of the recharging process may be controlled by reference to the current flowing to the electrode 114.

A modified form of tube according to this invention will now be described with reference to Figures 8–10. In most particulars the tube resembles that of Figures 1–4 and will not therefore be illustrated separately except insofar as Figure 8 shows an opened-out view of the deflection array which differs from that of the previous embodiment illustrated in Figure 4. The essential difference is that the slope of the conductors in the region F—G is in the same sense as in the region B—C in this instance instead of being in the opposite sense as in Figure 4. In other words, the end portions of the array G—H are higher than the portions E—F opposite which they lie in the assembled array at the right-hand end just as at the left-hand end, the end portions A—B are higher than the portions C—D opposite which they lie in the assembled array. The operation of this form of tube also differs from that of the previous embodiment, it being arranged that the forward sweep of the frame scan is effected step-by-step by discharging operations taking place during each line flyback time while the frame flyback is achieved during the normal flyback time by a progressive recharging action.

The waveforms employed for this type of operation are shown in Figure 9. Figure 9(*a*) shows the X or line sweep waveform which in this case has a "dwell" only at the end of the line flyback so that the beam is maintained for a short time before the commencement of each line in the discharging region 6'. It will also be seen that the line sweep saw-tooth has a growing amplitude, while during the frame flyback time the waveform has a slowly falling potential. These features are to correct the effect of trapezium distortion which would otherwise be present in a tube of this kind. In the previous embodiment also this correction for trapezium distortion is, of course, required during the frame scan but is not needed in the frame flyback time since the beam is blacked out during the frame flyback.

The amplitude of the trapezium distortion correcting waveform is controlled by reference to the signal picked up by electrode 114 so that it at all times corresponds to the position in the frame scan or flyback in fact reached by the beam.

In Figure 9(*b*) the modulation waveform for the picture beam is shown and comprises in the line flyback times bright-up pulses $I_d$ which serve to release the beam during the time of the "dwell" of the line sweep in the discharge region 6', the normal line brightness modulation, and a prolonged bright-up pulse during the frame flyback for the recharging operation.

The operation of the tube will be understood by consideration of the three diagrams of Figure 10, which correspond to the three diagrams of Figure 6. It must be explained, however, that whereas in Figure 6 the three diagrams correspond to three situations occurring successively in time within the period of one line scan, in Figure 10 the diagrams (*a*) and (*b*) show situations in the discharging zone and the screen area during successive times in one line scan while Figure 10(*c*) shows the situation in the recharging zone at a time during the frame flyback.

The conditions illustrated in Figure 10(*a*) correspond closely to those above described with reference to Figure 6(*a*) with the difference that there is no recharged zone above the discharging zone so that only one zone of transverse field exists. Above this the array is discharged and there is no field in the region 6'. Within the screen area the conditions shown in Figure 10(*b*) exist, there being, of course, a transverse field between the discharged part of the array and the screen layer above the deflection zone. The beam never enters this region, however, since it is deflected towards the screen in the deflection zone, which has an electrostatic field distribution of similar form to that shown in Figure 6(*b*).

In the region 6 depicted in Figure 10(*c*), however, the situation is different. Because of the high potential grid 127 the electrostatic field distribution is of the same form in this region as in the screen area. When the beam is released in the region 6 during the frame flyback time, therefore, it will be deflected towards the front portion of the array (region G—H, Fig. 8) and by striking out secondary electrons will charge the array conductors to the voltage of grid 127 as in the previous embodiment. However, the stagger between the front and rear portions of the array conductors (as indicated by the oblique broken lines) is such that the conductors the ends of which are bombarded by the beam are those in the zone of transition from the charged state to the discharged state producing the beam deflection. These conductors are therefore recharged so that the zone at which deflection of the beam is produced moves progressively upwards until the whole array is recharged. The action is analogous to that of the discharging action which produces the frame scan, the main difference being that since the action of the beam is to recharge or raise the potential of the array conductors, the zone of recharge will move in the opposite direction to that in which the discharge zone moved, i. e. upwards instead of downwards. A further difference is, of course, that whereas the discharging action for the forward sweep of the frame scan is carried out step-by-step, each step taking place at the commencement of a line by virtue of the short release of the beam in region 6′, the frame flyback or recharging takes place in one smooth operation within the frame flyback time while the beam is released in the region 6. It will be appreciated that the current in the beam, during this flyback phase, must be adequate to recharge the array fully within the time available. It will not matter, however, if the current in the beam is greater than the minimum required, since the array cannot be "overcharged" but will stabilise itself at the potential of the grid 127 and no harm will result if the beam experiences a short "dwell" at the top of the array prior to commencement of the next frame scan.

In this form of tube the advantage is achieved that, since the whole of the frame flyback time is available for the recharging process the current in the recharging beam can be less than is required in the case of the previous embodiment.

It is inherent in the system of deflection employed in the two embodiments of the invention above described that as the frame scan proceeds the amplitude of the X deflection saw-tooth must increase since a greater angular deflection must be produced at the deflector plates 16 to provide the full line length at the bottom of the tube than is required at the top of the tube. In other words, it is necessary to correct for keystone distortion. By the same token it is necessary to reduce the X deflection potential progressively during the frame flyback recharging process so as to maintain the beam incident upon the array in the region G, H as the recharging zone runs up the array. These corrections are shown on the X-deflection waveform diagram Figure 9(*a*).

An alternative arrangement for producing the charging of the array without using the effect of secondary emission described above will now be described with reference to Figure 11. This figure is in two parts, part *a* being a cross-sectional view of the electrode array 3 and associated parts in the region 6, and part *b* being a fragmentary elevation of a part of this assembly. The system follows the same principles as have been described in co-pending patent application Serial No. 623,666 and employs the effect of photo-conductivity to control direct charging of the array from the main HT power pack. The ends of the array conductors at H make contact with a photo-conductive layer 121 formed on the supporting sheet which carries the conductors 3. The layer 121 provides a photo-sensitive path connecting the conductors 3 to an electrode 117 which is permanently connected to the HT power pack. A transparent strip 116 for example of glass or quartz has one surface in contact with the layer 121 and carries on its opposite surface a luminescent layer 119 backed by a thin aluminium coating 120. This coating is connected, together with the electrode 117, to the main HT power pack. In the absence of illumination the layer 121 effectively insulates the array from HT. If however, the layer 120 is bombarded by the electron beam and luminescence is produced in the layer 119, the illumination of layer 121 thus set up provides a conducting path between the HT supply and the conductors of the array in the illuminated region. The array is thus recharged in a region illuminated by the electron beam direct from the H. T. power pack and by this system appreciable reduction of the current needed in the electron beam for the recharging process is made possible. Control of the electron beam to bombard the coating 120 in the proper region to set up a recharging wave progressing upwardly across the array is effected in this case just as in the embodiment described with reference to Figures 8 to 10, the coating 120 in this case performing the function of grid 127 insofar as the electron optics of the system are concerned, although, of course, with the difference that the electron current in the beam flows to the coating 120 and secondary electron emission performs no part in the process.

The same arrangement can be used for the discharging process, the only difference being that for the discharging process the electrode corresponding to electrode 117 would have to be connected to a point of low potential, e. g. the cathode of the tube.

In order to provide the various facilities demanded of the electron beam in the tube according to this invention, it may be preferable to provide a composite cathode/grid structure for the electron gun, having separate, individually modulated cathodes for each of the electron beams performing the various functions. Such a composite cathode/grid structure is shown in Figure 12 in which *a* is an end view of the cathode/grid structure and *b* and *c* are sectional views on two diameters at right angles. Assuming that the tube is to be used for three colour picture presentation, the grid provides three small apertures arranged in line across the centre of the grid face for red, green and blue picture beams marked R, G and B respectively. A separate cathode is provided behind each aperture, as shown in Figure 12(*c*), so that each colour may be independently modulated. The distribution of these three apertures provides a distribution of the three beams corresponding to the three colours across the space between the screen and the deflection array and this displacement of the beams relative to one another provides the basis for colour selection in the manner which has been fully described in the above-mentioned Patent No. 2,795,729 and will not, therefore, be described in further detail here.

On either side of the three picture beam apertures are provided larger apertures 140 each of which has a cathode 141 behind it and these two cathodes produce through their respective grid apertures electron beams of greater cross-section and greater current capacity than the picture beams, which are used for the charge and discharge process. The use of a composite cathode of this nature enables the different current values required for the beams employed in the discharging region, the picture region and the recharging region, to be more readily attained.

In the construction of a tube according to the invention the general considerations of design applicable to tubes according to Patent No. 2,795,729 apply. However, whereas in some of the embodiments of the earlier specification, a double electrode array is provided of which one portion extends across the screen and between the two parts of which the electrostatic deflecting field is set up for deflecting the end portion of the beam into contact with the screen, in the forms of tube according to the present invention, the screen is maintained independently at a constant potential and there is no such double array. Because of this, it has been found that to obtain optimum operating conditions for the beam, it is preferable to make the conditions such that the wave front of the wave of discharge which travels down the array shall be as steep as possible but that the discharge of the array shall be incomplete. It can be shown that optimum conditions are obtained if the voltage of the array is reduced in the discharge wave to about 0.25 $V_m$ or within the range 0.2–0.4 $V_m$ where $V_m$ is the maximum voltage in the tube i. e. the voltage of the screen. These conditions are illustrated in the diagrams of Figure 6 and Figure 10, discussed above, which show the degree of residual charge left in the array behind the discharge wave front.

Mention has been made above of the adaptation of the tube for colour presentation. It will be appreciated that the techniques of Patent No. 2,795,729 may be employed to the extent that zones of phosphor of different colour characteristics are applied to the screen and that the beam operates through a "shadowmask" at different angles of incidence so as to strike the different zones according to the colour presentation required. The various angles of incidence are produced as in the embodiments of the earlier patent specification by displacement of the beam towards or away from the screen. There is the difference, however, that in tubes according to the present invention, the shadowmask will be of uniform fixed potential and will not form part of the deflection electrode array which produces the frame scan except, of course, to the extent that it provides over the whole surface of the screen a high potential surface between which, and the rear deflection array, the deflection field is set up.

It will be appreciated that the embodiments described above are by way of example only and that many modifications may be made in the form of the tube as realised in practice. For example, in the second embodiment above described, it is not necessary to use a grid such as the grid 127 in the recharging region of the array. An alternative structure comprises a strip electrode positioned between the edge of the screen and the ends of the array conductors so as to receive secondary emission from the array when it is bombarded by the beam. In these circumstances, the bending of the beam towards the front portion of the array in the region 6 will be effected by the field set up between the front and rear portions of the conductors by virtue of the vertical stagger introduced as shown in Figure 8. Similarly, other forms of electrode can be used in this part of the system suitably located to receive secondary emission from the array, it being understood, of course, that the beam need not be caused to bombard the front portion of the array but can be guided, by suitable configuration of the conductors, to bombard any other region appropriate for the purpose. It is preferable, however, to arrange for the beam not to have to progress far beyond the edge of the screen before being brought into contact with the array so as to minimise the amplitude of X-deflection required.

I claim:

1. A cathode ray tube comprising a screen, an array of conductive elements in a plane facing said screen, means for directing an electron beam into the space between said screen and said array, and means for controlling the potentials on the elements of said array so as to deflect an end portion of said electron beam towards said screen at varying distances across it, said potential controlling means comprising means for effecting at different times electron bombardment of at least two separate zones of said array and means associated with at least one of said zones for collecting secondary electrons emitted by said array under the effect of electron bombardment.

2. A cathode ray tube comprising a luminescent screen, an array of conductive elements each extending crosswise of said screen, said array lying in a plane substantially parallel to said screen and facing it across a gap, means for directing an electron beam into said gap in a direction crosswise of said conductive elements, and means for controlling the charges on said conductive elements so as to produce deflection of an end portion of said beam towards said screen at varying distances across it, said charge controlling means comprising means for directing an electron beam towards and into impact with selected portions of said conductive elements, said selected portions lying in two zones extending crosswise of said array, one of said zones being associated with means for collecting secondary electrons emitted by said conductive elements when bombarded by electrons in that zone whereby such bombardment is effective to charge the conductive elements, while in the other said zone bombardment of said conductive elements by electrons is effective to discharge said conductive elements.

3. Cathode ray tube comprising a luminescent screen, an array of linear conductive elements extending crosswise of said screen and arranged in closely spaced parallel relation in a plane parallel to said screen, means for directing an electron beam into the gap between said screen and said array, means for displacing said beam across the screen in the direction parallel to said conductive elements, and means for controlling the charges on said conductive elements so as to produce deflection of an end portion of said electron beam towards said screen at varying distances across the array, wherein said linear conductive elements extend beyond the boundaries of said screen into two zones each of which extends across the array and with one of which is associated a high voltage electrode positioned to receive secondary electrons emitted by the array under the action of electron bombardment in the respective zone, whereby said electron beam may be directed at different times into contact with the elements of said array in each of said zones so as to effect charging and discharging of said array in a desired manner.

4. Cathode ray tube according to claim 3 wherein said two zones are provided one on each side of the screen and comprise portions of said array in which the conductive elements are looped back upon themselves to form channel regions into which the electron beam may be directed for charging and discharging purposes.

5. Cathode ray tube as claimed in claim 4 wherein the channel region into which the electron beam is directed for charging purposes embraces a mesh electrode covering a marginal area of the array and wherein the electron beam is directed through said mesh to bombard said marginal area, said mesh electrode serving to receive secondary electrons emitted by the array when so bombarded.

6. Cathode ray tube as claimed in claim 5 wherein the end portions of said conductive elements follow a tortuous configuration such that the parts thereof facing one another across the channel regions are staggered in the direction of the electron beam whereby the end portion of the beam is deflected towards the conductive elements adjacent those conductive elements the potentials on which produce the beam deflection so that electron bombardment serves to displace the point at which the end portion of the beam is deflected and the system is self-progressing.

7. Cathode ray tube as claimed in claim 6 wherein the staggered relation between the parts of the conductive elements is in the same sense in each of the two said zones, whereby charging of said conductive elements in the one zone progresses the point of beam deflection in one sense and discharging of said conductive elements in the other zone progresses the point of beam deflection in the reverse sense.

8. Cathode ray tubes as claimed in claim 6 wherein the staggered relation between the parts of the conductive elements is in opposite senses in the two zones whereby charging of said conductive elements in one zone and discharging of the conductive elements in the other zone progress the point of deflection of the electron beam in the same sense.

9. Cathode ray tube comprising a screen, an array of linear conductive elements extending crosswise of said screen and arranged in closely spaced parallel relation one above the other in a plane facing said screen, said conductive elements extending beyond the edges of said screen into two marginal zones in which the array is looped back upon itself to form channel shaped regions, the conductive elements in said marginal zones being zig-zagged so that the end of one element lies opposite a part of another element higher in the array across the mouth of the corresponding channel region, a mesh electrode within one of said channel regions overlying the ends of the conductive elements, means for directing an electron beam into the space between said screen and said array, and means for deflecting said beam at times into one of said channel regions and at other times into the other said channel region.

10. Cathode ray tube comprising a screen, an array of conductive elements each extending crosswise of said screen in a plane parallel to said screen and facing it across a gap said conductive elements extending beyond the side edges of said screen into two marginal zones, in at least one of said marginal zones an electrode positioned adjacent but spaced from the ends of the conductive elements forming said array, a photoconductive medium bridging the spaces between said electrode and the ends of said conductive elements, overlying said photoconductive medium a layer of luminescent material, means for directing an electron beam into the space between said screen and said array of conductive elements, and means for deflecting said electron beam crosswise of said screen, at certain times into one of said marginal zones and at other times into the other of said marginal zones and into impact with said layer of luminescent material.

11. Cathode ray tube as claimed in claim 10 wherein said layer of luminescent material is provided on one surface of a transparent body another surface of which lies against said photo-conductive medium.

12. A cathode ray tube comprising a screen, an array of conductive elements in a plane facing said screen, means for directing an electron beam into the space between said screen and said array, and means for controlling the potentials on the elements of said array so as to deflect an end portion of said electron beam towards said screen at varying distances across it, wherein said conductive elements extend into at least two separate zones in one of said zones said conductive elements terminating at a distance from an electrode extending crosswise of said array, a layer of photoconductive material extending between said electrode and said conductive elements and affording a light-sensitive resistive path therebetween, a strip of transparent material overlying said layer, on the surface of said strip of transparent material remote from said photoconductive layer a layer of luminescent material, and means for directing an electron beam at different times into each of said zones to effect in one zone bombardment of the conductive elements and in the other zone bombardment of said luminescent material so as to discharge said elements by said bombardment in the one zone and to charge said elements by conduction in said photoconductive layer under control of illumination from said luminescent material set up by electron bombardment thereof.

13. Cathode ray tube as claimed in claim 12 wherein the conductive elements are made, in the said zones, of zig-zag configuration with one portion of one element facing a different portion of another element across a gap into which the electron beam is directed, whereby a given potential distribution on one part of a succession of conductive elements is operative to direct said end portion of the electron beam towards another part of an adjacent succession of conductive elements so that the operative succession of conductive elements is self-progressing across the array.

14. Cathode ray tube as claimed in claim 13 wherein, in the charging zone, the said luminescent layer is maintained at high potential by contact with a metallic layer suitably energised whereby the deflection of the end portion of the electron beam towards the appropriate region of said array is caused by a transverse field set up between the operative succession of conductive elements and said high potential metallic layer.

15. Cathode ray tube comprising a screen, an electron gun for setting up an electron beam in a plane parallel to said screen, and means for deflecting an end portion of said beam towards and into impact with said screen, said means comprising an array of conductive elements in a plane substantially parallel to said screen and on the side of said beam remote from said screen and means for effecting charging and discharging of the elements of said array to set up thereon the potentials necessary for deflecting said end portion, said last named means comprising means for directing said electron beam at different times towards at least two different parts of said array, and means associated with at least one of said parts for causing bombardment thereof by said beam to effect charging of the array while bombardment of the other of said parts is effective to discharge said array.

16. Cathode ray tube as claimed in claim 15 wherein the means for causing bombardment of a part of said array to effect charging of the array comprises a high potential grid overlying the said part of the array and adapted to collect secondary electrons emitted by the array under the action of said bombardment.

17. A cathode ray tube comprising a screen, an array of conductive elements in a plane facing said screen, means for directing an electron beam into the space between said screen and said array, and means for controlling the potentials on the elements of said array so as to deflect an end portion of said electron beam towards said screen at varying distances across it, said potential controlling means comprising means for effecting at different times electron bombardment of at least two separate zones of said array and means associated with at least one of said zones for causing charging of said array under the action of electron bombardment.

18. A cathode ray tube comprising a screen, an array of conductive elements in a plane facing said screen, means for directing an electron beam into the space between said screen and said array, and means for controlling the potentials on the elements of said array so as to deflect an end portion of said electron beam towards said screen at varying distances across it, said potential controlling means comprising means for effecting at different times electron bombardment of a part of said array for the purpose of discharging it and means associated with another part of said array for causing charging of the array under the action of electron bombardment.

19. A cathode ray tube as claimed in claim 18 wherein the means for causing charging of the array comprises a portion of the array itself in association with means for collecting secondary electrons emitted by the array under the action of electron bombardment.

References Cited in the file of this patent

UNITED STATES PATENTS

| | | |
|---|---|---|
| 2,795,729 | Gabor | June 11, 1957 |
| 2,795,731 | Aiken | June 11, 1957 |
| 2,809,324 | Shanafelt | Oct. 8, 1957 |